US012215777B1

(12) United States Patent
Currier et al.

(10) Patent No.: US 12,215,777 B1
(45) Date of Patent: Feb. 4, 2025

(54) SMART SYSTEM FOR LUBRICATION FLUID DELIVERY

(71) Applicant: Zulu Pods, Inc., Davie, FL (US)

(72) Inventors: Todd M. Currier, Davie, FL (US); Robert Sladen, Davie, FL (US); Troy P. Cunningham, Davie, FL (US); Adam Smedresman, Davie, FL (US)

(73) Assignee: Zulu Pods, Inc., Davie, FL (US)

( * ) Notice: Subject to any disclaimer, the term of this patent is extended or adjusted under 35 U.S.C. 154(b) by 0 days.

(21) Appl. No.: 17/576,607

(22) Filed: Jan. 14, 2022

(51) Int. Cl.
*F16H 57/04* (2010.01)
*F16H 57/01* (2012.01)
*F16N 11/04* (2006.01)
*F16N 19/00* (2006.01)
*F16N 29/02* (2006.01)

(52) U.S. Cl.
CPC ......... *F16H 57/0442* (2013.01); *F16H 57/01* (2013.01); *F16H 57/045* (2013.01); *F16H 57/0456* (2013.01); *F16N 11/04* (2013.01); *F16N 19/003* (2013.01); *F16N 29/02* (2013.01); *F16H 2057/012* (2013.01)

(58) Field of Classification Search
CPC ........ F16N 11/04; F16N 19/003; F16N 29/02; F16H 57/01; F16H 57/0442; F16H 57/045; F16H 57/0456
See application file for complete search history.

(56) References Cited

U.S. PATENT DOCUMENTS

| 1,717,814 | A | * | 6/1929 | Strong | F16N 13/20 |
| | | | | | 417/291 |
| 2,214,485 | A | * | 9/1940 | Short | F16H 57/0458 |
| | | | | | 184/6.12 |
| 2,343,492 | A | * | 3/1944 | Bartolett | F16H 57/0456 |
| | | | | | 184/6.12 |
| 3,245,386 | A | * | 4/1966 | Bentele | F01C 19/04 |
| | | | | | 418/99 |
| 4,836,334 | A | * | 6/1989 | Bras | F16N 11/04 |
| | | | | | 384/473 |
| 5,060,760 | A | * | 10/1991 | Long | F16C 19/52 |
| | | | | | 184/7.4 |
| 5,069,177 | A | * | 12/1991 | Dokonal | F01M 5/025 |
| | | | | | 123/196 R |
| 5,097,926 | A | * | 3/1992 | Duello | F01D 25/18 |
| | | | | | 184/6.26 |

(Continued)

Primary Examiner — Minh Truong
(74) Attorney, Agent, or Firm — Maynard Nexsen PC; Todd A. Serbin

(57) ABSTRACT

A smart system for oil delivery including a dispenser assembly, a pressure supply assembly, a gearbox assembly, and an electronic assembly. The dispenser assembly including a dispenser. The dispenser being an enclosure with a hollow interior with a valve located at one end. The hollow interior of the dispenser defining a reservoir for the storage of oil or other lubrication fluids. The interior of the dispenser further including a pressure supply assembly. The pressure supply assembly including a spring and a plunger that are oppositely located with respect to the valve within the interior of the dispenser. The electronic assembly includes a flow meter, a solenoid valve, and a microcontroller unit. The electric valve being actuated by the microcontroller unit to allow the pressure supply assembly to expel oil stored within the reservoir via the valve.

9 Claims, 3 Drawing Sheets

(56) References Cited

U.S. PATENT DOCUMENTS

| | | | | |
|---|---|---|---|---|
| 6,189,656 | B1* | 2/2001 | Morgenstern | F16N 17/06 184/7.4 |
| 8,746,068 | B2* | 6/2014 | Goodman | G01M 3/24 118/679 |
| 9,051,909 | B2 | 6/2015 | McAlister | |
| 10,012,305 | B2* | 7/2018 | Louis | F16H 57/0442 |
| 10,746,353 | B2 | 8/2020 | Kinner et al. | |
| 11,199,293 | B2* | 12/2021 | Gibson | F16N 29/02 |
| 11,408,559 | B2* | 8/2022 | Wawrzola | F16N 11/08 |
| 2003/0115977 | A1* | 6/2003 | Holweg | F16C 19/52 702/113 |
| 2004/0197040 | A1* | 10/2004 | Walker | F16C 41/008 384/624 |
| 2004/0250623 | A1* | 12/2004 | Walker | F16C 33/102 73/593 |
| 2005/0034881 | A1* | 2/2005 | Berger | F16N 29/02 173/171 |
| 2007/0251329 | A1* | 11/2007 | Balasu | F16H 57/01 73/810 |
| 2011/0253481 | A1* | 10/2011 | Lin | F16N 11/08 184/108 |
| 2012/0157256 | A1* | 6/2012 | Takeuchi | F03D 15/00 475/159 |
| 2012/0227820 | A1* | 9/2012 | Poster | F01M 5/001 184/6 |
| 2012/0247876 | A1* | 10/2012 | Kreutzkamper | F16N 7/385 184/14 |
| 2013/0183138 | A1* | 7/2013 | Johnson | F03D 80/70 415/110 |
| 2014/0110938 | A1* | 4/2014 | Okazaki | F03D 9/25 290/2 |
| 2016/0186811 | A1* | 6/2016 | Conley | F16C 33/6607 184/6.1 |
| 2018/0017210 | A1* | 1/2018 | Letscher | B60R 17/02 |
| 2018/0030885 | A1* | 2/2018 | Bagayatkar | F16N 13/10 |
| 2021/0190265 | A1* | 6/2021 | David | F16N 11/08 |

* cited by examiner

SMART SYSTEM FOR LUBRICATION FLUID DELIVERY

BACKGROUND OF THE INVENTION

1. Field of the Invention

The present invention relates to a smart system for oil delivery and, more particularly, to a smart system for oil delivery that incorporates the use of sensors to actuate a self-contained and self-pressurized oil reservoir.

2. Description of the Related Art

Several designs for a smart system for oil delivery have been designed in the past. None of them, however, include a self-energized system with an active means of metering oil flow from the oil reservoir.

Applicant believes that a related reference corresponds to U.S. Pat. No. 10,746,353 issued for a remotely controlled material delivery system having at least one canister for containing a material; a nozzle; a manifold to direct movement of the material from the canister to the nozzle; a valve mechanism to control the flow of material; a signal receiver; a power source; a mounting adapter; and a remote controller operable to generate a signal wherein the signal is transmitted from the remote controller to the signal receiver. Applicant believes that another related reference corresponds to U.S. Pat. No. 9,051,909 issued for a system for safe storage and efficient utilization of a variety of fuel selections that range in composition and phase from cryogenic mixtures of solids and liquids to elevated temperature gases is provided for unique applications with various types of heat engines and fuel cells including hybridized combinations. None of these references, however, teach of a self-contained oil reservoir that incorporates the use of an integrated microprocessor unit that receives signals from various sensors to actuate a pressure supply that dispenses oil.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a smart system for oil delivery that includes an integrated microprocessor to interpret signals from various sensors to actuate a solenoid valve or a proportional flow valve that dispenses oil from a reservoir.

It is another object of this invention to provide a smart system for oil delivery that includes an independent pressure supply that is self-contained.

It is still another object of the present invention to provide a smart system for oil delivery that includes an independent power source and wireless communication.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
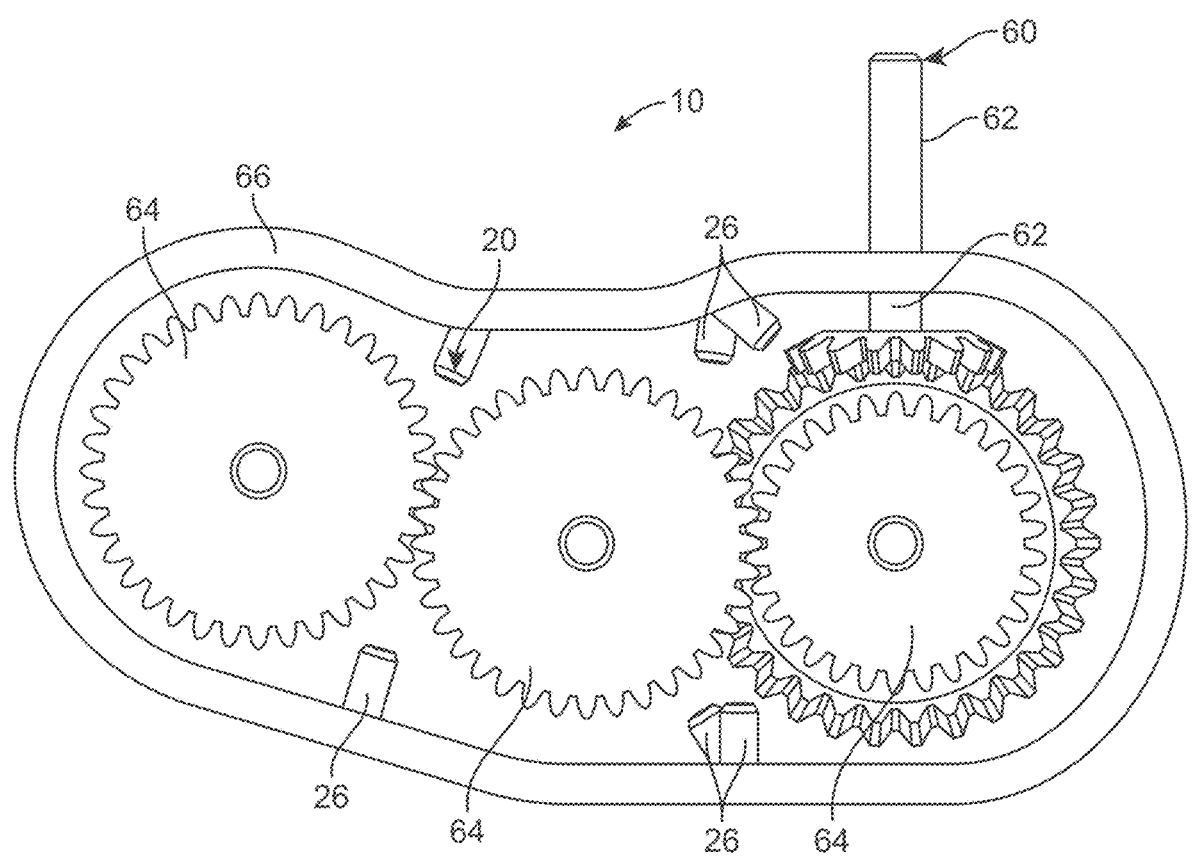
FIG. 1 represents a cross sectional view of a gear box assembly 60 with dispenser 26 of dispenser assembly 20 mounted in multiple locations therein.

Referring now to the drawings, where the present invention is generally referred to with numeral 10, it can be observed that it basically includes a dispenser assembly 20, a pressure supply assembly 40, a gearbox assembly 60, and an electronic assembly 80. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
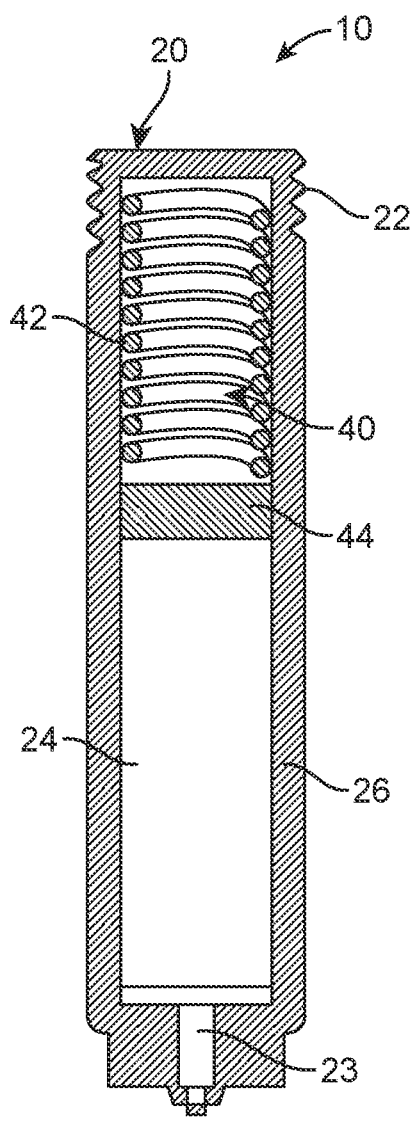
FIG. 2 shows a cross sectional view of the dispenser 26 of the dispenser assembly 20 with a reservoir 24 and a pressure supply assembly 40 enclosed therein.

Best illustrated in FIG. 2 dispenser assembly 20 may include a dispenser 26. The dispenser 26 may be an enclosure that serves as a housing for the reservoir 24 and the pressure supply assembly 40. The dispenser 26 may be a cylindrical housing with opposing flat distal ends. It should be understood the shape of the dispenser 26 may vary as deemed suitable for the environment said dispenser 26 is placed in. The dispenser 26 may include a threaded portion 22 extending downwardly from a top end. Wherein the threaded portion 22 may allow for the dispenser 26 to be mounted within the gearbox housing 66 of the gearbox assembly 60. The gearbox assembly 60 may have various iterations depending on the machinery it is located within. The threaded portion 22 provides a securing means to maintain the dispenser 26 in place. Due to the possible movement and vibrations while the machinery is in operation, the threaded portion 22 helps avoid the positional displacement of the dispenser 26. Secure placement of the dispenser 26 is important due to the directional operation of said dispenser 26. The dispenser 26 may further include a hollow interior. Wherein the hollow interior of the dispenser 26 defines a reservoir 24. The reservoir 24 may span from a middle portion to the bottom portion of the dispenser 26. The reservoir 24 may facilitate the storage of lubrication fluids such as oil therein. In communication with the reservoir 24 is channel 23. Wherein the channel 23 may provide an outlet for the oil or other lubrication fluids to be expelled therefrom. In one embodiment the reservoir 24 may be filled with oil via an opening or port located on the dispenser 26. In an alternate embodiment the channel 23 may be bi-directional to facilitate refilling the reservoir 24 after being emptied. It may also be suitable to incorporate multiple channel 23 to the dispenser 26. Wherein the multiple channels 23 may allow a user to gain easier access to be able to refill the reservoir 24 from multiple angles. Located at a reservoir top end may be the pressure supply assembly 40.

Figure 3:
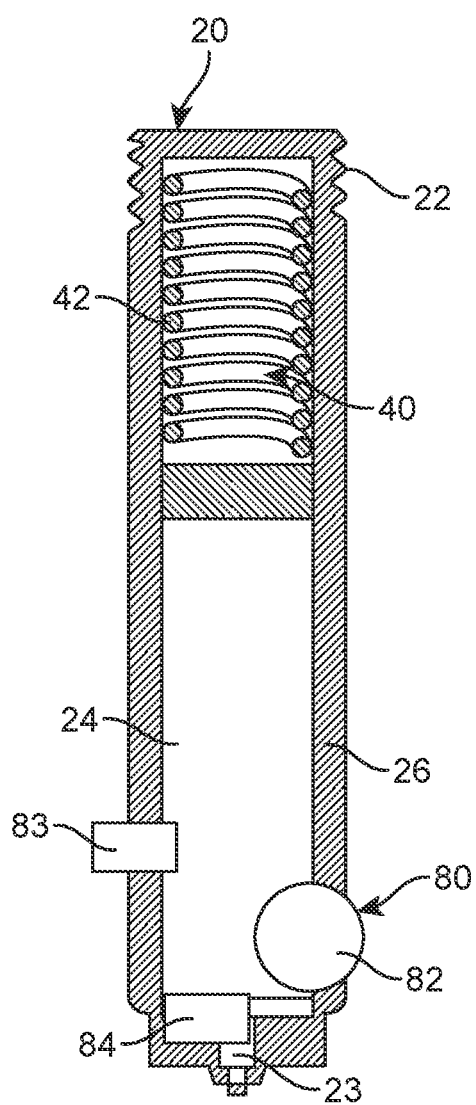
FIG. 3 illustrates a cross sectional view of the dispenser 26 with an electric valve 84 of the electronic assembly 80 located at the channel 23. An oil quality sensor 83 and a flow meter 82 is also shown mounted to the dispenser 26 in accordance with the current embodiment.

As shown in FIG. 2-3 the pressure supply assembly 40 may be contained within a top interior portion of the dispenser 26. The pressure supply assembly 40 may include a spring 42 and a plunger 44. The spring 42 pushing from the interior top end of the dispenser 26 may force the plunger 44 towards the channel 23. It may be suitable for the interior of the dispenser 26 to create an air tight environment when the electric valve 84 is closed. The air tight environment does not allow the oil or lubrication fluid within the reservoir to be expelled and thus maintains a constant stored pressure with the spring 42 and the plunger 44 in place. The opening of the electric valve 84 releases the stored pressure and allows for the plunger 44 to be pushed downward toward said channel 23. The oil or lubrication fluid thereby contained within the reservoir 24 is forced out of the dispenser 26 in the direction of the channel 23. As demonstrated in FIG. 1 the channel 23 may allow for the precise directional release of lubrication fluids such as oils within a gearbox housing 66. The pressure supply assembly 40 may allow for a pressure system that is independent from the rest of the machinery. This has the added benefit of dispensing oil or lubricating fluid directly onto gears 64, bearing, or seals located within the gearbox housing 66 in the event of an emergency or loss of lubrication. Thereby extending the life of machinery and gears 64 contained therein.

Figure 4:
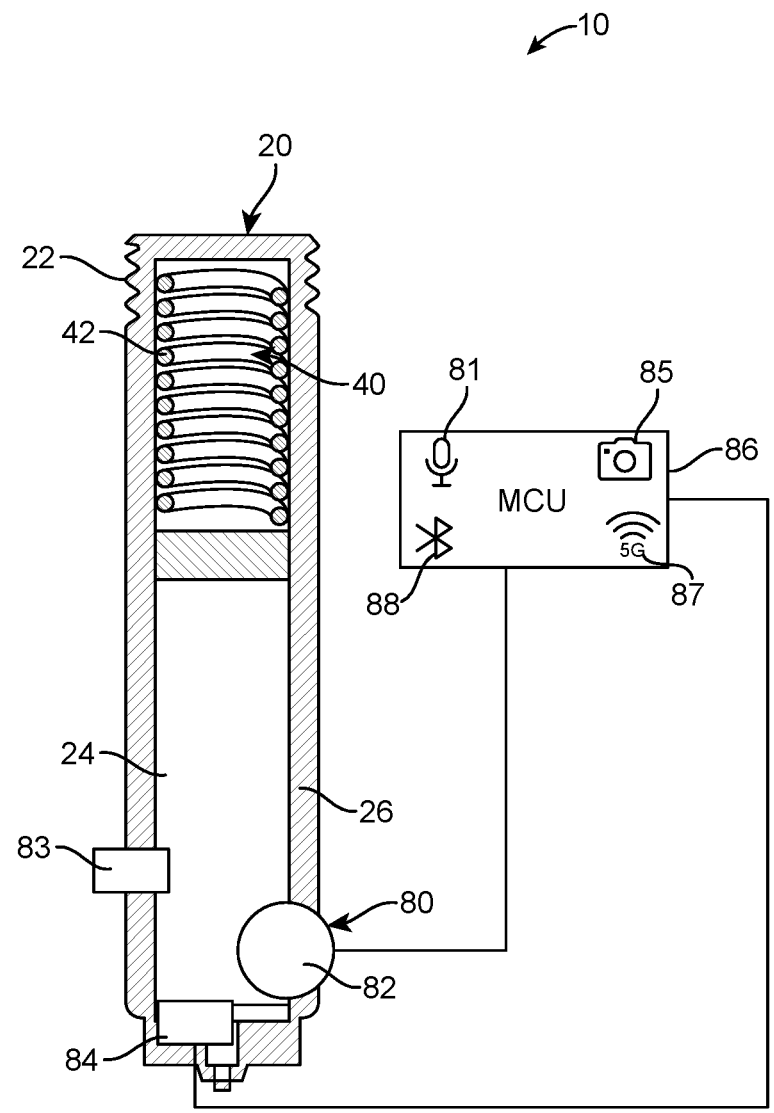
FIG. 4 is a representation of the microcontroller unit 86 of the electronic assembly 80 in communication with flow meter 82 and the electric valve 84. The microcontroller unit 86 including wireless communication (such as Bluetooth 88 and Wi-fi 87) to communicate with secondary sensors such as microphone 81 and camera 85.

Depicted in FIG. 3-4 the dispenser 26 may include several sensors disclosed in electronic assembly 80 that are mounted thereon to meter, dispense, and/or measure oil or lubrication fluid stored within the reservoir 24. The electronic assembly 80 may include a microphone 81, a flow meter 82, an oil quality sensor 83, an electric valve 84, a camera 85, and a microcontroller unit 86. In the embodiment shown in FIG. 3 the flow meter 82 may be located at a bottom portion of the dispenser 26 above the channel 23. The flow meter 82 may be mounted within the reservoir 24 or, in an alternate embodiment, along an exterior surface of the dispenser 26. The flow meter 82 may allow for precise metering measurements to be taken of the oil or lubrication fluid as it is expelled from the reservoir 24. Wherein the flow meter 82 may measure units of volume over a period of time such as ml/s or milliliters per second. The flow meter 82 may generate an electrical signal calibrated to transduce the measured electrical signal to a user's predetermined flow rate. It may be suitable for the flow meter 82 to function within an analog embodiment of the electronic assembly 80. Wherein the flow meter 82 outputs a voltage or a current. In multiple embodiments the flow meter 82 may take the form of turbines, pressure based flow meters, or ultrasonic flow meters. The oil quality sensor 83 may also be mounted within the reservoir 24 or along an exterior surface of the dispenser 26. The oil quality sensor 83 may provide characteristic data on the state of the oil or lubrication fluid being stored within the reservoir 24. The characteristic data measured by the oil quality sensor 83 may include but is not limited to viscosity, density, dielectric constant, fluid temperature. Furthermore, the oil quality sensor 83 may detect contaminants such as metal shavings or chips that can have debilitating effects on bearings and gears as the oil circulates therethrough.

It may be suitable for the electric valve 84 to be actuated by the microcontroller unit 86. Upon actuation, the electric valve 84 may allow for oil or lubrication fluid to flow to the exterior of the dispenser 26 via the valve 23. The microcontroller unit 86 may detect the state of the electric valve 84 to define the state of activation. The camera 85 and the microphone 81 may also function as sensors that provide feedback to the microcontroller unit 86. It should be understood that the electric valve 84 may include features capable of limiting the flow rate of oil as is exits the reservoir 24 of the dispenser 26 via the channel 23. In one embodiment the electric valve 84 may be a solenoid valve. In an alternate iteration the electric valve 84 may be a proportional flow valve. The proportional flow valve allows for varying degrees of actuation by the microcontroller unit 86 to increase or decrease the amount of oil being dispensed from the reservoir 24 located within the dispenser 26. In one embodiment the camera 85 may include thermal imaging capabilities to relay temperature readings of specific areas within a gearbox housing 66. A predetermined range of temperature may allow for a signal to be generated by the microcontroller unit 86 to actuate the electric valve 84 should the measured temperature readings fall outside of the predetermined range. The microphone 81 may be placed adjacent to the contact points of gears 64 to record sound signatures that may fall out of an audible human range. The recorded sound signatures may help the microcontroller unit 86 determine the state of lubrication for said gears 64. The recorded sound signatures may be compared to the sound signature of optimally lubricated gears by the microcontroller unit 86.

Further included within the electronic assembly 80 may be an oil quantity sensor, a laser, an accelerometer, a proximity probe, and a power source. In one embodiment the power source may take the form of a battery. Alternatively, the powersource may be a wireless power supply implemented to provide power to the electronicassembly 80 via induction. The power source used for the electronic assembly 80 may also include a wired connection between the power supply used to drive the machinery to the electronic assembly 80 that is placed within said machinery. The power source may also be implemented in the form of stored mechanical energy or a pressurized gas. Alternate iterations for the power source used to power the microcontroller unit 86 may include a thermoelectric power unit that converts environmental thermal energy into electricity or an electrical generator capable of converting the rotational energy of the tower shaft 62 into electricity. The proximity probe may serve as a means of measuringdisplacement over a period of time. Wherein the displacement measured by the proximity probe may allow for the determination of potentially damaging resonances of the gears 64 while said gears 64 rotate. The oil quantity sensor may be mounted within the dispenser 26 or along an exterior surface of said dispenser 26. The oil quantity sensor may take positional measurements of plunger 44 for the microcontrollerunit 86 to calculate the amount of oil or lubrication fluid left within the reservoir 24. A laser may also be mounted to the exterior of dispenser 26 and adjacent to the channel 23. It may be suitable for the laser to be pointed toward the gears 64 to measure a predetermined range of vibrational displacement. The laser measuring vibrationaldisplacement that falls outside of the predetermined range of vibrational displacement may be detected by the microcontroller unit 86 to actuate the electric valve 84. In an alternate embodiment, the microcontroller unit 86 may wirelessly communicate with a plurality of additional microcontroller units integrally mounted to additional dispensers. The microcontroller unit 86 may also include an embodiment wherein a wired connection is used for communication between said microcontroller unit 86 and other nearby sensors of the electronic assembly 80. Thereby creating a network of dispensers in communication with each other. This has the added benefit of creating redundancies within the network of dispensers should an emergency take place within a gearbox housing 66. It should be understood the position or location of the sensors disclosed within electronic assembly 80 may be dependent on the application of the dispenser assembly 20 within various size and dimensions for the gearbox assembly 60.

An alternate embodiment may further be implemented for the electronic assembly 80 wherein analog components are used. The analog components may include a proportional feedback implemented through the use of passive components such as operational amplifiers and resistors. For example, a thermistor may be coupled to a proportional flow valve attached to the dispenser 26. A signal may be captured by the thermistor and amplified to be used as an input signal for the proportional flow valve, thereby controlling the flow of oil out of the oil reservoir 24.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A smart system for lubrication fluid delivery, consisting of:
   a) a gearbox assembly including a gearbox and a system of gears mounted therein, the system of gears including gears cooperatively engaged to one another;
   b) a dispenser assembly including a channel and a dispenser, the dispenser being an enclosure including a hollow interior, the hollow interior defining a reservoir, wherein a lubrication fluid is stored within the reservoir and is expelled via the channel, the channel being located at a dispenser end, the dispenser having a cylindrical shape and including a threaded portion located opposite of the channel, said threaded portion facilitating mounting the dispenser within a gearbox interior, the gearbox interior including the system of gears, the dispenser being mounted in alignment to the system of gears to facilitate the lubrication fluid being expelled onto said system of gears;
   c) a pressure supply assembly including a spring and a plunger, wherein the spring is engaged with the plunger, said plunger being displaced with an expansion and a retraction of the spring, said spring being mounted within the dispenser and oppositely located with respect to the channel, the plunger being located between the spring and the channel; and
   d) an electronic assembly including a microphone, at least one lubrication fluid quality sensor, a flow meter, an electric valve, and a microcontroller unit powered by a power source, wherein the microcontroller unit generates a signal to actuate the electric valve to an open state, the electric valve being a proportional flow valve, the open state of the electric valve allows for the lubrication fluid to be expelled via the channel, said flow meter measuring an output quantity of the lubrication fluid to provide an output reading to the microcontroller unit, wherein the output reading prompts the microcontroller unit to actuate the electric valve to a closed state thereby preventing the flow of lubrication fluid through the channel, the microcontroller unit including wireless communication to transmit and receive signals from an additional microcontroller unit located on an additional dispenser, the microphone is configured to record a sound signature from the system of gears, the sound signature being compared to a secondary sound signature of lubricated gears by the microcontroller unit to subsequently generate a signal to actuate the electric valve, the at least one lubrication fluid quality sensor being mounted to the dispenser to relay characteristic data of the lubrication fluid to the microcontroller unit in the form of at least one of viscosity, density, dielectric constant, lubrication fluid temperature, and contaminant detection.

2. The smart system for lubrication fluid delivery of claim 1, wherein said wireless communication includes at least one of Bluetooth or Wi-Fi.

3. The smart system for lubrication fluid delivery of claim 1, wherein the sound signatures are compared to a secondary sound signature of optimally lubricated gears by the microcontroller unit to subsequently actuate the electric valve.

4. The smart system for lubrication fluid delivery of claim 1, wherein said at least one lubrication fluid quality sensor mounted to the dispenser to relay characteristic data of the lubrication fluid to the microcontroller unit in real-time in the form of at least one of viscosity, density, dielectric constant, fluid temperature, and contaminant detection.

5. The smart system for lubrication fluid delivery of claim 1, wherein said power source is a thermoelectric power unit that converts environmental thermal energy into electricity.

6. The smart system for lubrication fluid delivery of claim 1, wherein said power source is a generator that converts the rotational energy of a shaft within a gearbox to electricity.

7. The smart system for lubrication fluid delivery of claim 1, wherein the flow meter measures units of volume over a period of time, wherein an output signal from the flow meter is inputted into the microcontroller to adjust said electric valve opening.

8. The smart system for oil delivery of claim 1, wherein said power source is a wireless power supply that provides power to the microcontroller unit via induction.

9. The smart system for oil delivery of claim 1, wherein said power source is a wired power supply that provides a wired connectivity between a gearbox power supply and the microcontroller unit.

* * * * *